United States Patent [19]
Garris

[11] Patent Number: 4,969,598
[45] Date of Patent: Nov. 13, 1990

[54] VALVE CONTROL

[75] Inventor: Charles A. Garris, Vienna, Va.

[73] Assignee: Memry Plumbing Products Corp., Norwalk, Conn.

[21] Appl. No.: 397,110

[22] Filed: Aug. 22, 1989

Related U.S. Application Data

[63] Continuation-in-part of Ser. No. 74,885, Jul. 17, 1987, Pat. No. 4,875,623.

[51] Int. Cl.⁵ ............................................. G05D 23/12
[52] U.S. Cl. ..................................... 236/12.12; 137/3; 364/502
[58] Field of Search .................. 236/12.12; 364/502; 137/3

[56] References Cited

U.S. PATENT DOCUMENTS 4,406,401  9/1983  Nettro ............................. 236/12.12
4,854,498  8/1989  Stayton ........................... 364/502 X

FOREIGN PATENT DOCUMENTS 0282308  12/1987  Japan ............................. 236/12.12

Primary Examiner—William E. Wayner
Attorney, Agent, or Firm—Connolly & Hutz

[57]  ABSTRACT

A computer controlled hot/cold water mixing valve in which the set point discharge water temperature is controlling by measuring the hot inlet temperature and the cold water inlet temperature and performing appropriate calculations with the computer based on the measured temperatures.

14 Claims, 8 Drawing Sheets

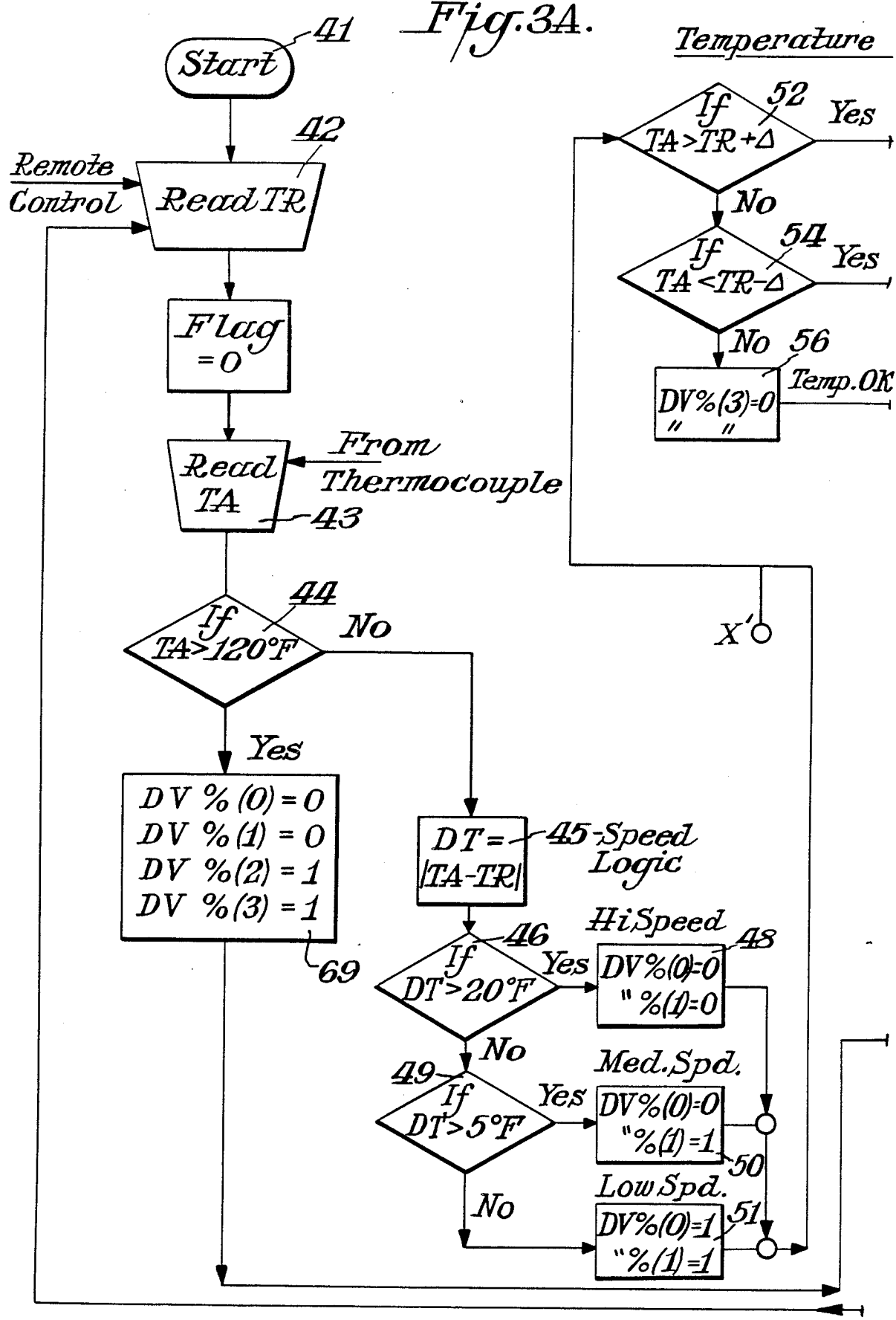

VALVE CONTROL

CROSS REFERENCE TO RELATED APPLICATION

This application is continuation-in-part of copending application Ser. No. 07/074,805 filed July 17, 1987, now U.S. Pat. No. 4,875,623.

This invention relates to control of the temperature of water flowing through a flow system by a control valve in the system and more particularly to methods and devices for detecting control valve position and the temperature of water discharging from the control valve by comparing detected input data relative to valve positioning and changes in water temperature and pressure with specified input date.

BACKGROUND OF THE INVENTION

Methods and apparatus for producing a water discharge having the desired temperature have already been described in which a control system constantly monitors the temperature of a discharge and compares said temperature with a desired temperature, and if the two are found to differ, generates a control signal to bring the temperature of the discharged output to a desired temperature.

However, the above method and apparatus have an essential drawback in a complex electro-mechanical control mechanism employed to control temperature in the flow and discharge. Various mechanical features are disclosed and complicate obtaining the stated purpose. Furthermore, these methods would generally be slow in order to avoid discharge temperature overshoot and oscillation.

One apparatus and method provides a control wherein the water discharge temperature oscillates in a time cycle around a predetermined mean value with adjustable amplitudes. This is imprecise.

SUMMARY OF THE INVENTION

It is an object of this invention to provide by a microprocessor an adjustable control of the temperature of water discharge from a mixing valve in which the rate of adjustment is variable and more particularly in which the relative positioning of the mixing valve is coordinated with regulation of the water temperature by mixture in the valve.

It is an object of this invention to provide a system for monitoring flowing liquid temperatures by observing the temperature of the liquid at the inlet and the angular position of a control valve shaft so that the positioning of the valve is coordinated with regulation of the liquid temperature at the valve outlet.

Another object of the present invention is the control of the temperature at the outlet of a control valve in liquid flow system with a minimum of variation in the discharge temperature of the liquid discharging from the control valve.

It is a further object of this invention to provide a system for control of the water temperature by passing a flow of water through a rotatable mixing valve and observing the water temperature at valve inlet and outlet and the angular position of a shaft of the rotatable valve so that the regulation coordinates the temperature observation at the inlets with the temperature at the valve outlet.

Still another object of this invention is provision in a microprocessor controlled flow system of means for determining by the microprocessor the relative positioning of a mixing valve and the relationship between the position of the shaft of the valve and instructions for controlling water temperature and for providing control instructions when the valve is fully open or fully closed. Voltage generated in the operation is converted into a binary number.

A further object is apparatus and method for rapidly changing outlet water temperature but arriving at a preselected water temperature gradually by reducing the rate of change.

A still further object of this invention is a system in which a valve adjustment is coordinated with observation of a temperature of water in the system to regulate the water temperature to a preselected temperature.

Another object of the invention is a simple method and apparatus for water temperature control and avoiding complex mechanisms for driving a control valve.

In this invention, in a control system, a microprocessor controls hot/cold water mixing by a temperature regulating valve so that in demanding a water discharge temperature by means of an externally entered request the microprocessor provides a precise control of temperature regulation and receives binary signals generated by positioning of the regulating valve which are related to the temperature regulation in the operation of the valve.

The valve controls are designed to provide maximum water temperature in the event that hot water supply temperature is in excess of that temperature to provide a warning and a procedure programmed to shut down the discharge automatically in the event of dangerously high temperatures in the water.

In one embodiment of this invention illustrated in FIGS. 1 and 2, the control system senses water temperature by means of a thermocouple placed in the discharge outlet of the balanced pressure mixing valve having a rotatable main shaft which is rotatable, which rotation is controlled so that there is a relationship between the shaft position and instructions for controlling water temperature. The water temperature is controlled by variation in the relative proportions of hot and cold water passed thru and mixed in the mixing valve. The variation is effected by means of rotation of the shaft and a microprocessor instructed stepping motor operating the valve stem on the control valve (SBPV). This operation controls temperature and can shut off the flow. Thus, in this embodiment there is no sensor in the discharge end of the mixing valve with feedback to the microprocessor. The microprocessor analyzes the data and then adjustments are made in the mixing control in the valve.

The control of temperature is performed with a three-speed control system to optimize the speed of convergence to a requested temperature.

In the embodiment of FIGS. 1 and 2 the discharge of the valve is fitted with a thermocouple probe. Two limit switches are actuated by means relating to valve position, such as a cam placed on the control valve stem in such a way that a high TTL voltage is provided whenever the valve is either fully opened or fully closed. This voltage is converted into a binary number.

The central processing for the signals is provided by a computer with an interactive structures Model DAI 120 A/D convertor and a Model DDI 160 D/D converter. The DDI 160 can provide both digital input and digital output. The valve limit switches provide digital input, while the digital outputs control the stepping motors via a stepping motor controller providing clockwise/counterclockwise operation, speed control and disable. Two digital outputs control the stepping motor speed via a circuit incorporating two relays. This arrangement enables a choice of three stepping motor speeds. The speed selected depends upon the difference between the requested temperature and the actual temperature. If the temperature difference is large, a high speed is desirable in order to rapidly approach the requested temperature. However, if the temperature difference is small, a slower speed is necessary in order to avoid overshoot and oscillation of the temperature. For very precise temperature control, a very slow speed is useful.

In another embodiment of this invention particularly illustrated in FIGS. 4 and 5, the control system senses water temperature by means of thermocouples placed in the inlets of the balanced pressure mixing valve. Also the valve position is observed. The variations in the relative proportions of hot and cold water is effected by a microprocessor instructing a motor operating the control valve. The inlet water temperatures and the angular position of the control valve are provided to this microprocessor where the digital outputs send digital commands to determine the operation of the valve. Thus in this embodiment by measuring temperatures of hot and cold input water with a calculation of expected output temperature a faster response time is achieved, based on the calculated output.

As a further embodiment is a system having measurement of the input temperatures and observing the angular position of the valve for obtaining a calculated output value and also sensing the temperature of the discharge water and comparing the calculated and actual output values in coordination with actuating valve control.

DESCRIPTION OF CONTROL ACTION

In the operation of the limit switch logic, the programmed calculations provide instructions in accordance with the following. Referring to the embodiment of FIGS. 1 and 2, if the mixing valve 12 is fully closed and the temperature control instructions call for reduction of water temperature, the instruction is to disable the motor controller 16 and cease operation of the motor 15 leaving the system in a closed shutdown condition. This is represented by the decision diamond 62 of FIG. 3B.

If the valve 12 is fully opened and the temperature control instruction calls for increase in temperature, the programmed instructions is to disable the motor controller 16 and cease operation of the motor 15 leaving the system in a shutdown condition. This is represented in FIG. 3B by the decision diamond 64.

If the binary signals from the limit switches 26 and 27 indicate that the valve is in an intermediate position and if there is no shutdown command from the remote control 24, the programmed instructions from the temperature control calculations are carried out. This is represented by the decision diamond 57 of FIG. 3B.

In the operation of the shutdown command logic the calculations provides instructions in accordance with the following. A shutdown command from the remote control 24 with the valve 12 of FIG. 2 in other than a fully closed position carries the program to calculations providing instructions for the closing of valve 12 at medium speed. This is represented in FIG. 3 by the decision diamonds 66 and 68 and the operations block 67. Then when the valve 12 is fully closed the instruction is to disable the motor control of 16 of FIG. 2 and cease operation of the motor 15. This is represented in FIG. 3B by the decision diamond 60 and the block 61.

Similar logic occurs in calculations providing instructions in the operation of the embodiment illustrated in FIGS. 4 and 5.

The computer is programmed in BASIC and various logic schemes can be prepared for the performance of the valve control. While the computer is in operation, temperatures may be requested, or the system may be turned on or shut down, by means of an external control box.

In another embodiment the control system calculates the discharge water temperature by means of thermocouples in inlet lines and a potentiometer reporting the angular position of the control valve.

The discharge water temperature is controlled by adjusting the valve angular position. This embodiment involves a unique function of valve angle for each particular valve design in a determination of the calculated discharge water temperature.

The inlet water temperatures are fed to the computer on a continuous basis from thermocouple in the hot water and cold water inlet lines. The angular position of the control valve is fed to the computer from a potentiometer on the valve shaft and thus is provided with data on the opening and closing of the valve.

The objects and advantages of the invention will become apparent from following detailed description taken in connection with the accompanying drawings.

BRIEF DESCRIPTION OF THE DRAWINGS

FIGS. 3A and 3B are a program flow chart showing steps in the valve control according to the embodiment of FIG. 1;

DETAILED DESCRIPTION OF EMBODIMENT OF FIGS. 4 AND 5

Figure 4:
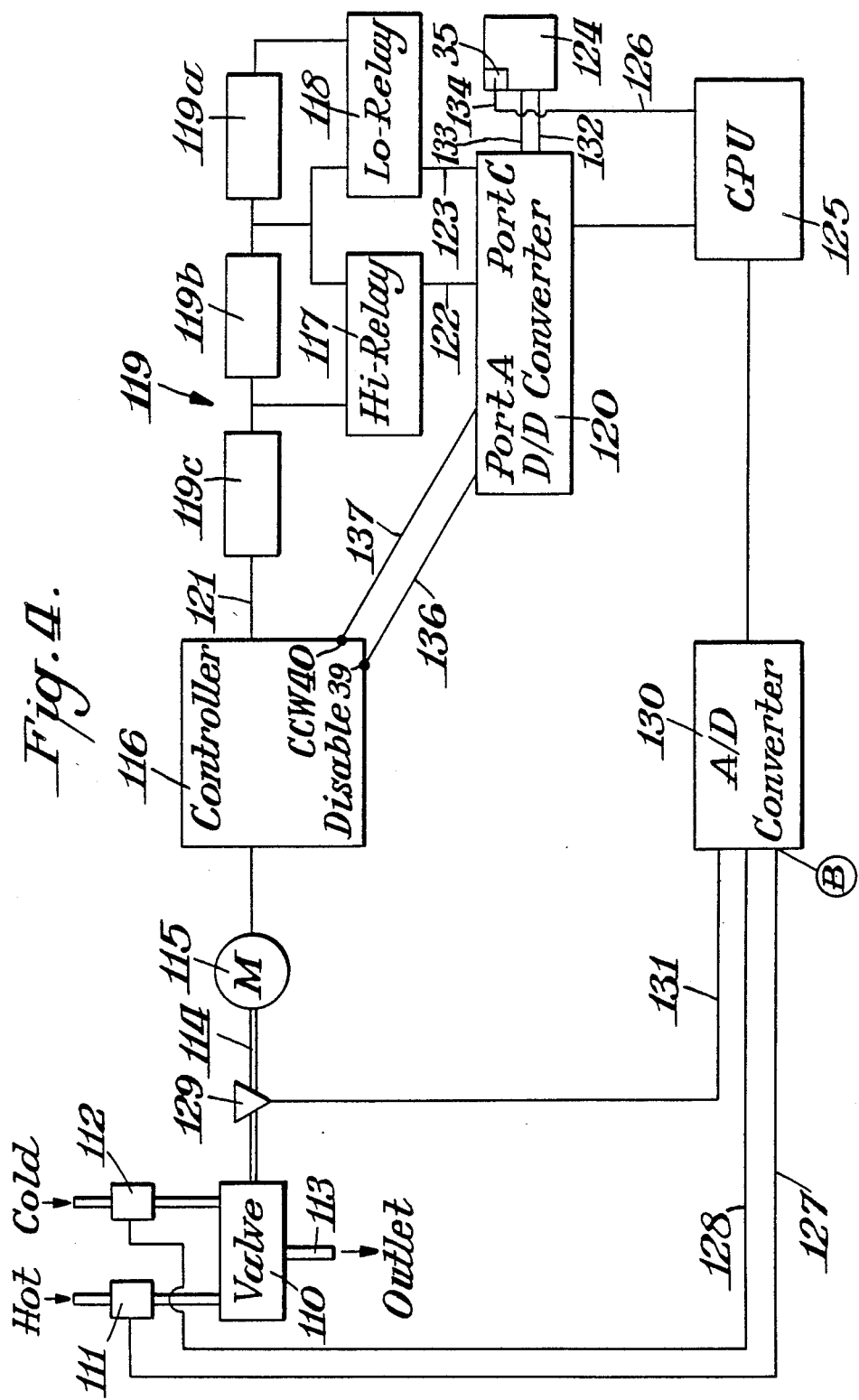
FIG. 4 is a schematic diagram of another embodiment of the valve control system.

The system shown in FIG. 4 is provided with a mixing valve 110 supplied with water from a hot water inlet line 111 and a cold water inlet line 112 and an outlet line 113. The hot water inlet 111 and cold water inlet 112 are provided with suitable temperature sensors 111 and 112 respectively, such as thermocouples. The valve 110 is controlled thru a drive shaft 114 of a stepping motor 115. The shaft 114 under the actuation of the motor 115 adjusts the setting of the valve 10 by connection of the shaft 114 to the valve stem (not shown). The stepping motor 115 in turn is controlled by a stepping motor controller 116 which provides the stepping motor 15 speed control and clockwise/counterclockwise rotation which is transmitted to the valve 110 and effects positioning of the valve 110.

In the balanced pressure apparatus of valve 110 the flows of hot and cold water are regulated independently to yield a substantially constant total flow rate. Effects of hot or cold water pressure transients are avoided by means of the pressure balancing module. A pressure sensing means is physically displaced by changes in pressure on either hot or cold side associated with an adjustable valve means with the relationship of that association being such that increases in the sensed pressure on one side result in a valve reaction causing decrease in pressure on the same side, tending to equalize the pressure under all conditions.

Control of the stepping motor 115 and the operation of the valve 112 is provided through the controller 116, a high speed relay 117, a low speed relay 118 (Potter and Brumfield R10 E1ZZ-S800 Relays) and a voltage divider 119 having resistor sections 119a (500 millohms), 119b (100 kilohms) and 119c (56 kilohms).

Digital outputs from a D/D converter 120 (DDI-16, Digital ±10 Interface) on line 121 to the controller 116 and lines 122 and 123 to the high speed relay 117 and low speed relay 118, respectively send digital commands to the controller 116 and thus determine the operation of the valve 110.

The D/D converter 120 is fed signals from a remote control 124 and a computer 125. The remote control 124 is comprised of a set of switches provided with suitable power such as 5 volts.

A detector network consists of the sensors 111 and 112 feeding signals through lines 127 and 128 respectively and a potentiometer 129 to an A/D converter 130. The potentiometer attached to the drive 114 records and reports the angular position of the drive 114 and the position of valve 110 to the converter 130 thru line 131. After analog-to-digital conversion in the converter 130 digital signals are transmitted to the computer 125.

The computer 125 determines the discharge temperature of the water from valve 110 through outlet 113 by calculations from the temperature recordings and from the data of the valve position and compares that temperature value with the requested temperature value and makes calculations and decisions with this information for commands to the D/D converter 120.

While the computer is in operation, temperatures may be requested, or the system may be turned on or shut down by signals from the remote control 124. A digital signal to raise the requested water temperature is provided to the D/D converter 120 via line 132, a digital signal to lower requested water temperature via line 133 and the shutdown from switch 135 on the control 120 via line 134.

With the information from sensors 111 and 112 and potentiometer 129, the computer calculates the water discharge temperature and arrives at a decision in comparison with a requested temperature. The inlet hot and cold water temperatures and the angular position of the valve 110 are used by the computer to calculate the discharge temperature as a function of the equation:

$$T_a - T_c = (T_h - T_c) f(\theta)$$

where
$T_a$ = discharge temperature
$T_c$ = Cold water supply temperature
$T_h$ = Hot water supply temperature
$\theta$ = Angular position of the valve
$f(\theta)$ = a function of the angular position of the valve dependent upon the characteristics of the particular mixing valve used. It does not depend on hot and cold line pressures when a balanced pressure module is used. The factor f(0) is equal to its relationship of the discharge temperature minus the cold water temperature divided by the difference between the hot water temperature and the cold water temperature.

$T_c$ and $T_h$ are measured by sensors 111 and 112 respectively and $\theta$ is measured by the potentiometer 129.

In the schematic diagram of FIG. 4, lines 128 and 129 extend to port B of the converter 130 from the thermocouple 111 and 112 respectively. The lines 132, 133 and 134 from the remote control 124 are connected to converter 120 at port C. The converter 120 at port A has lines 122 and 123 to the respective relays 117 and a line 137b to the pin 140 for control of the drive 115. The converter 120 is connectible with the converter through these lines 122a and 123b and 136 and 137 with binary signals transmitted as ones and zeroes. The following tables identifying the nomenclature and the binary numbers in the binary codes for the states of and utilized in the operation of the program controlled calculations in the described embodiments, particularly as demonstrated in the logic flow chart of FIGS. 3A and 3B.

TABLE I

NOMENCLATURE FOR ULTRAVALVE LOGIC

TA = Actual Temperature
TR = Requested Temperature
D1 is temperature differential
FLAG 1 is

TABLE II

| | | HI SPD | MED SPD | LOW SPD |
|---|---|---|---|---|
| DV%(0) | RELAY # 1 | 0 | 0 | 1 |
| DV%(1) | RELAY # 2 | 0 | 1 | 1 |
| DV%(2) | DISABLE STEPPING MOTOR (0 = DISABLE, 1 = ENABLE) | | | |
| DV%(3) | ROTATION DIRECTION (0 = CW, 1 = CCW) | | | |

TABLE III

LIMIT SWITCH LOGIC (PORT B)

A = ARRAY %

| Decimal | Binary | CONDITION |
|---|---|---|
| 0 | (000) | Valve in intermediate position |
| 1 | (001) | Valve fully closed |
| 2 | (010) | Valve fully opened |
| 4 | (100) | Shutdown command, valve intermediate position |
| 5 | (101) | Shutdown command, valve fully closed |
| 6 | (110) | Shutdown command, valve fully opened |

Figure 5:
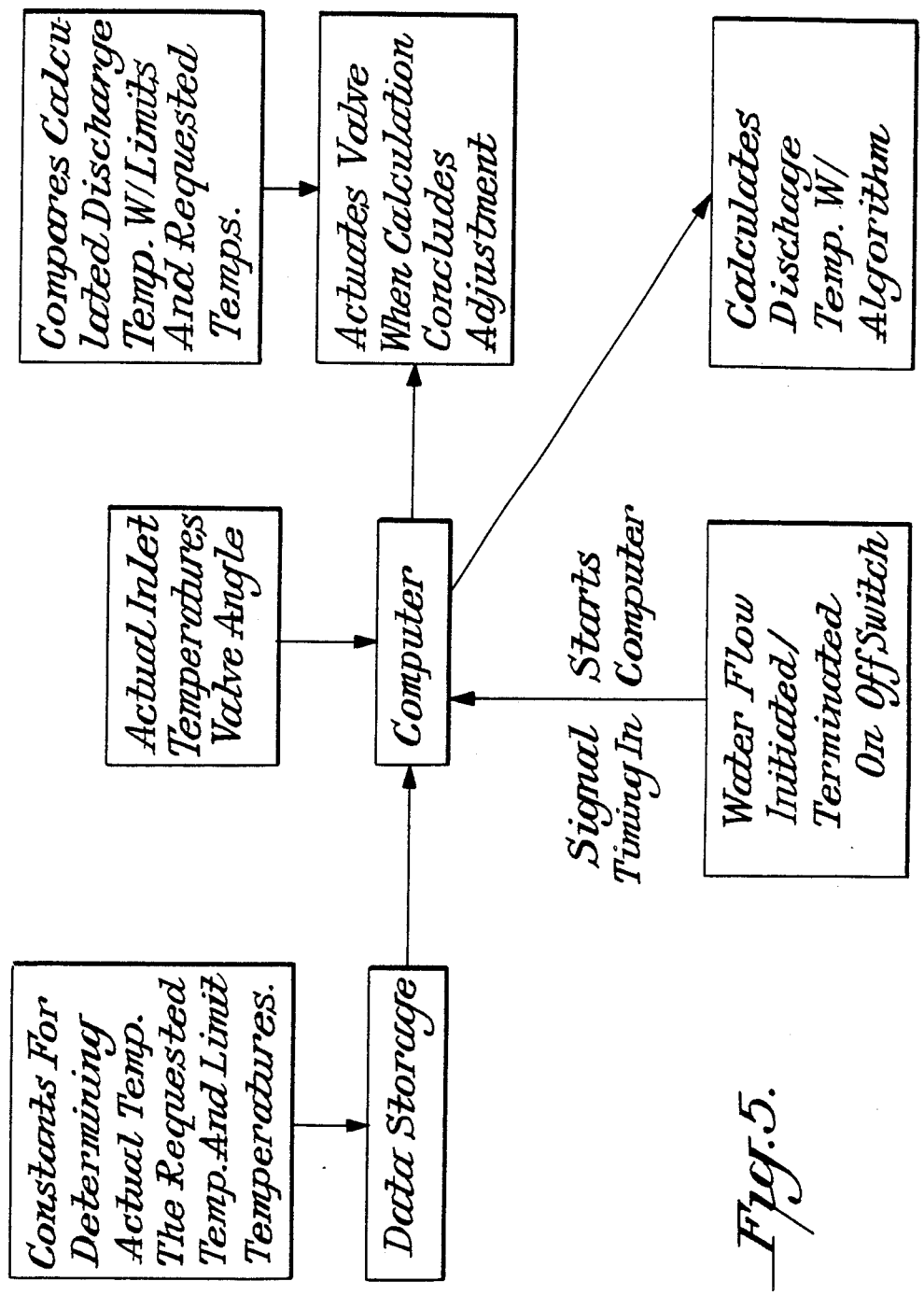
FIG. 5 is a flow sheet of the system for controlling discharge water temperature according to the embodiment in FIG. 4.

The system is provided with a data storage into which constants for determining the actual temperature, the requested temperature and the limit temperatures for the flowing water are fed, as shown in FIG. 5. The actual hot and cold water temperatures and the valve angle are fed to the computer. The data is available and is called upon when the water flow through the valve is initiated as by manual adjustment. When the computer is in operation it continually checks the position of the valve and the inlet water temperatures and the data bank having been provided by digital input with the data for the operation of the valve system.

Once the flow has started, the operation of the system is initiated and by the means explained in the present description the data is fed to the computer to determine the discharge temperature. The computer performs a series of calculations from the temperature and valve angle data readings and from the data on temperature limits and the requested temperature, then the computer sends the signals actuating the valve and the discharge temperature is adjusted.

Figure 6:
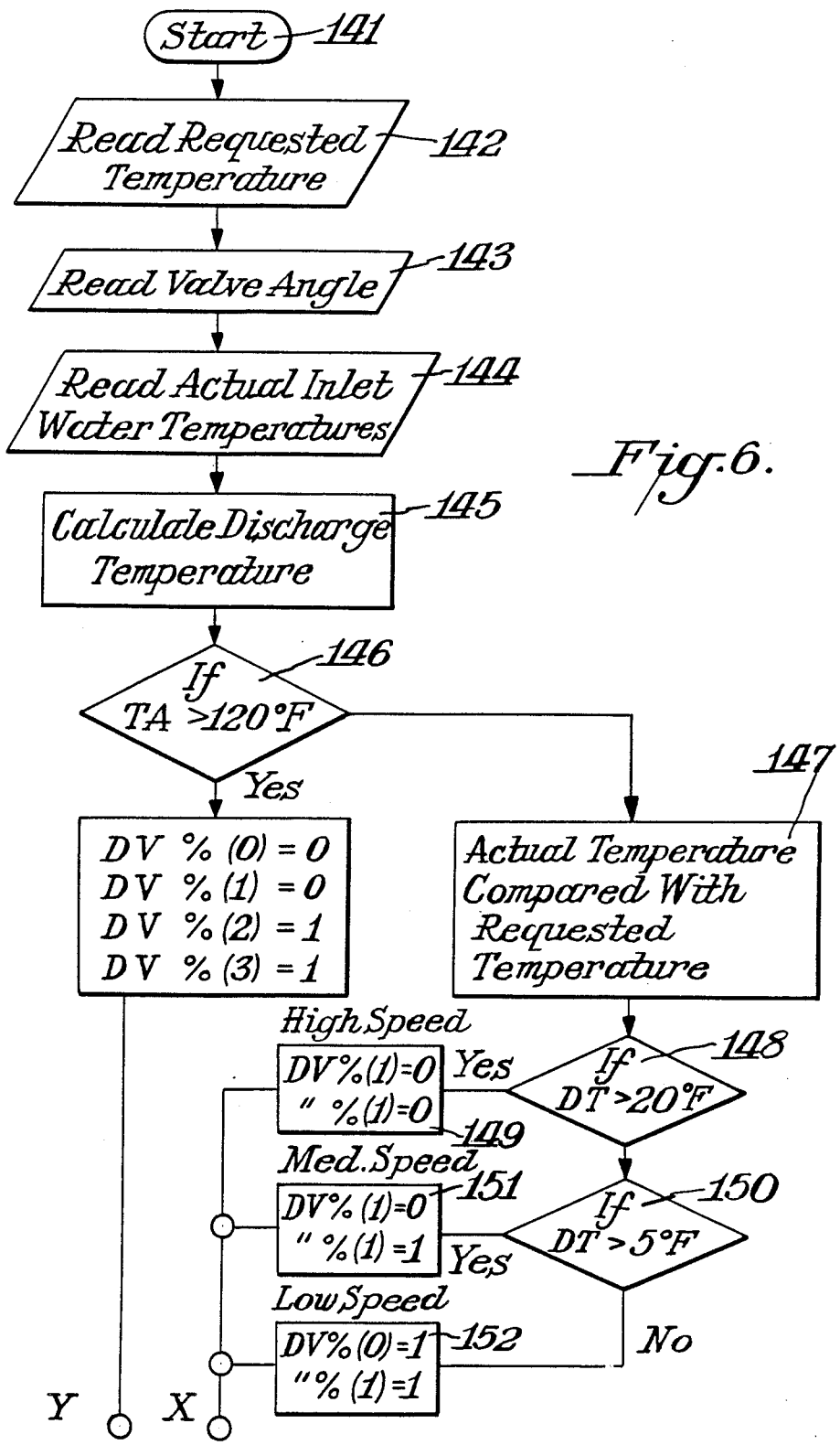
FIG. 6 is a flow chart showing steps in the valve control.

The logic flow chart of FIG. 6 is illustrative of program operation of the program stored in the computer 125 for control of the water temperature at the outlet 113.

The program is initiated by application of power as represented by oval 141. Then the requested temperature is read in from the remote control 124 as represented by the parallelogram 142. The next step is the reading of the valve position by the angular reading from the potentiometer 129, as represented by the parallelogram 143. Next step is the reading in from the sensors 111a and 112a of the actual temperature of the water at the inlets 111 and 112 represented at parallelogram 144. The angular position of the valve 110 and the inlet water temperatures at inlets 111 and 112 are converted to digital information in the A/D converter 130 and read by the computer 125. The angle of the valve 110 position and the inlet water temperatures, along with the data previously retrieved from data storage in the computer are used by the computer to calculate the outlet water temperature as a function of the equation:

$$T_a - T_c = (T_h - T_c) f(\theta)$$

where
$T_a$ = discharge temperature
$T_c$ = Cold water supply temperature
$T_h$ = Hot water supply temperature
$\theta$ = Angular position of the valve
$f(\theta)$ = a function of the angular position of the valve dependent upon the characteristics of the particular mixing valve used. This is represented by the block 145.

Once a value for the discharge water at outlet 13 has been calculated, the computer determines whether one actual outlet temperature exceeds the normal range, for example 120° F.

This decision point is represented by diamond 146. If the actual temperature is greater than 120° F. at decision point 146, the computer sends out an emergency shutdown signal as discussed in greater detail below.

One possible procedure according to this invention occurs at the negative branch of diamond 146 which takes the program to the calculation of the absolute value of the difference between the actual temperature and the requested temperature by subtraction of the requested temperature in block 147. After the calculation is done the output is advanced and represented by a decision diamond 148 and a judgment is made whether the difference is greater than 20° F. The affirmative branch of diamond 148 carries the program to providing a a high speed control represented by block 149.

In the system illustrated in FIG. 4 in the operation represented at block 149 of FIG. 6 a signal is generated for transmission of the high speed instruction to the relays 117 and 118. The digital output from port A of converter 20 is zeroes on both lines 136 and 137. Thus, in the function the computer 125 calculations provide that the valve 110 be operated at a high speed in response to the sensing of the actual temperature.

In FIG. 6 the negative branch from decision diamond 148 carries the program to a judgment whether the difference is greater than 5° F. as represented by decision diamond 150. The affirmative branch of diamond 150 carries the program to providing a medium speed control as represented in block 151. Referring to FIG. 4 in the operation represented at block 151 of FIG. 6 a signal is generated for transmission of the medium speed instruction to the relays 117 and 118. The digital output from port A of converter 120 is a zero on line 137 and a one on line 136. Thus in this function, the computer 125 calculations provide that the valve 110 be operated at a medium speed in response to the sensing of the actual temperature.

In FIG. 6 the negative branch from decision diamond 150 carries the program to an operation for generating a signal for transmission of the low speed instruction to the relays 117 and 118 of FIG. 4. The digital output from port A is ones on both lines 136 and 137. Thus, in this function, the computer 125 calculations provide that the valve 110 be operated at a low speed in response to the sensing of the actual temperature. In FIG. 6, the judgment at the decision points 146, 148 and 150 performed in the computer 125 carry out the logic process of motor speed selection for the embodiment of FIGS. 4 and 5 and the output is connected to terminal X of FIG. 6.

Figure 3B:
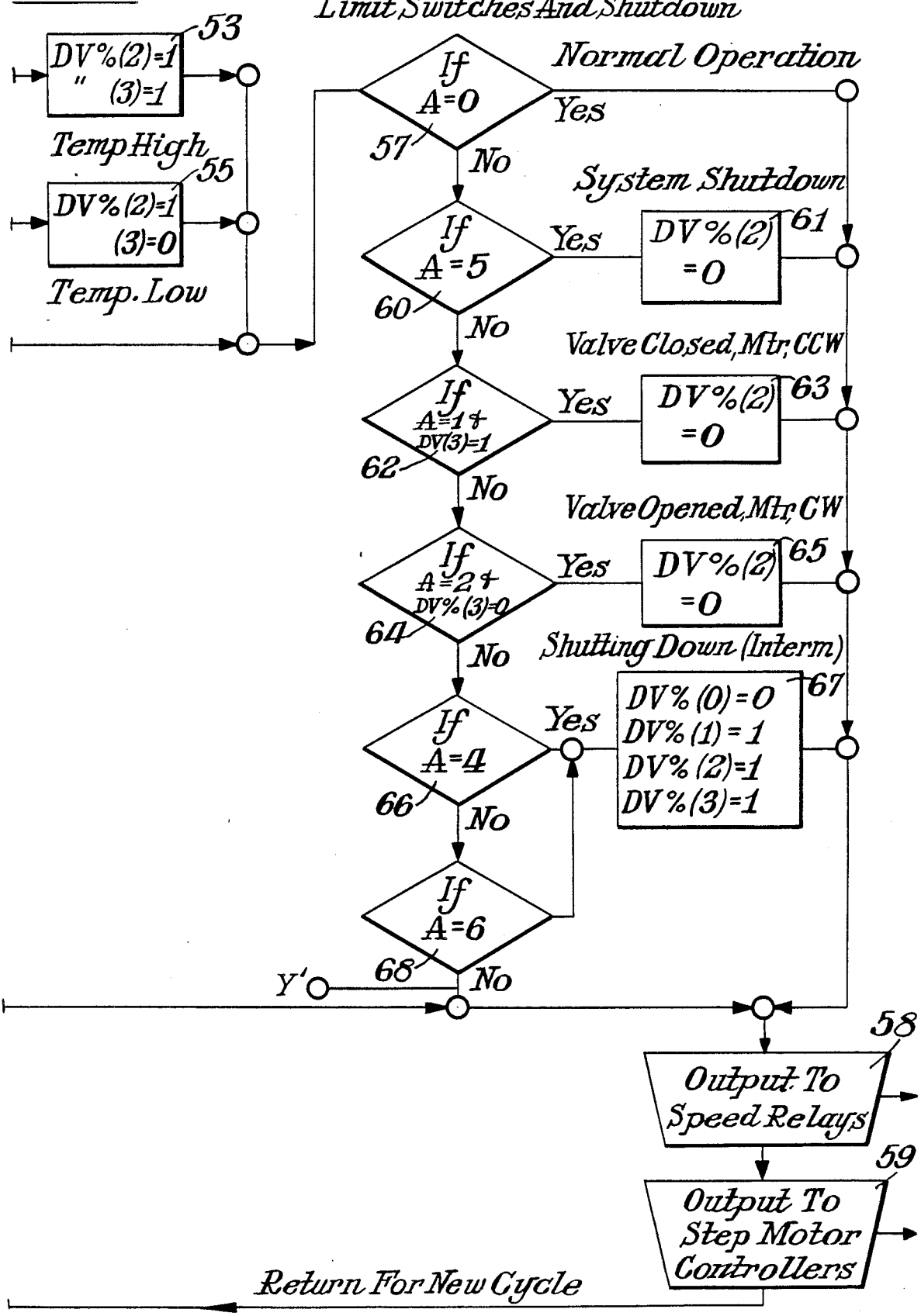

The performance of the logic process of temperature control by the program involves first a decision whether the actual temperature is greater than the requested temperature within a predetermined margin of error. This decision is represented by decision diamond 52 in FIG. 3A. In this embodiment terminal X of FIG. 6 is connected at terminal X' of FIG. 3A. The affirmative branch from the decision diamond 152 carries the program to providing an instruction to the controller 116 of FIG. 4 to operate the motor 115 to reduce the outlet water temperature. Referring to FIG. 3B, in the operation presented at block 53 a signal is generated for transmission of an instruction to the controller 116 of FIG. 4. The digital output from port A of converter 120 is a one on line 136 and a one on line 137. Thus in this calculation, the computer 125 calculations provide enabling the motor 115 and a counterclockwise rotation of drive shaft 114 which reduces the water temperature by reducing the flow of hot water and increasing the flow of cold water through the valve 110.

Referring to FIG. 3A the negative branch from the decision diamond 52 carries the program to a judgment whether the actual temperature is less than the requested temperature within a predetermined margin of error. This decision is represented by decision diamond 54. the affirmative branch from the decision diamond 54 carries the program to providing an instruction 54 to the controller 116 of FIG. 4 to operate the motor 115 to increase the water temperature. In the operation represented by block 55 of FIG. 3B, a signal is generated for transmission of an instruction to the controller 116 of FIG. 4. The digital output from port A of converter 120 is a one on line 136 and a zero on line 137. Thus, in this calculation, the computer 25 calculations provide enabling the motor 115 and a clockwise rotation of valve stem 114 which increases the water temperature by increasing the flow of hot water and decreasing the flow of cold water, through the valve 112.

Figure 2:
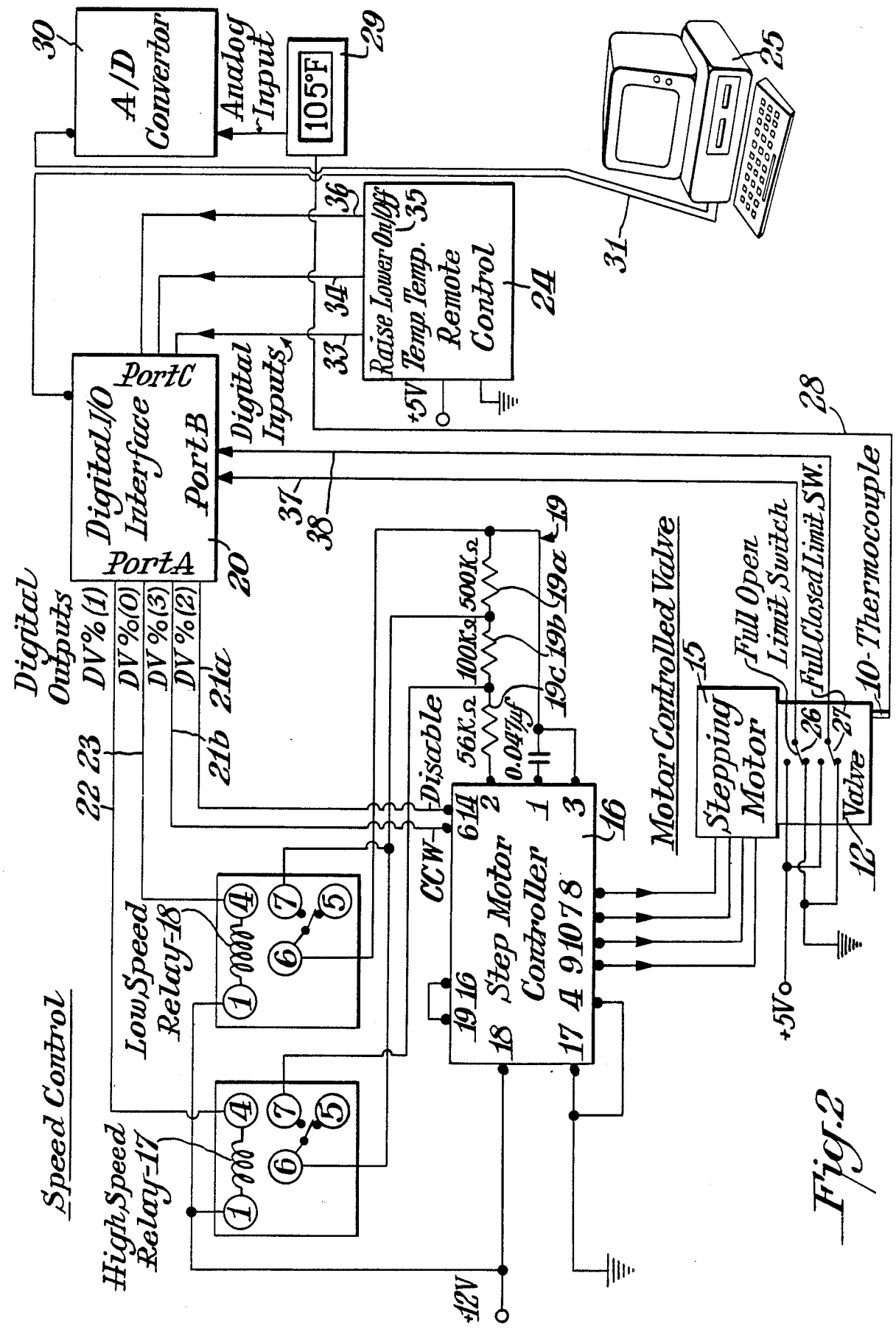
FIG. 2 is a schematic diagram of the valve control system according to FIG. 1.

Referring to FIG. 4, the negative branch from the decision diamond 54 carries the program to disabling the controller 116 of FIG. 2 because no instruction to the motor 115 is called for. In the operation represented by block 56 of FIG. 3B a signal is generated for transmitting an instruction to the controller 116 of FIG. 4. The digital output from port A is a zero on line 136.

Thus, in this calculation, the computer 125 calculations disable the motor 115 and no change in the valve takes place.

After the calculation of the temperature conditions and the instructions for the temperature control of the water output, a judgment is made of the position of the mixing valve relative to its fully open or fully closed positions and whether a shutdown command has been provided to the D/D converter 20 from the remote control 124. The limit switch is charted in the Table III.

The operation of the limit switch and shutdown logic as effected by binary signals is represented at the right side of the flow chart of FIGS. 3A and 3B. In the operation represented at the decision diamond 52 if the valve 112 is in an intermediate position between its relative fully open and fully closed positions and there is no shutdown command from remote control 124 the affirmative branch of diamond 57 carries the program to the instructions for transmitting the output from the D/D converter 120 as determined by the previous calculations. The operations pursuant to the instructions resulting from the previous calculations are represented in FIG. 3B by the trapezoid 58.

The negative branch of decision diamond 57 carries the program to the conditions of valve fully open or closed and shutdown command. The program involves a series of determinations as to shutdown commands and valve positions with the resultant decisions either terminating water flow or reducing the hot water flow, as follows.

The decision diamond 60 represents the determination whether there is a shutdown command with the valve 112 fully closed. The affirmative branch of the decision diamond 60 carries the program to an instruction to disable the controller 116 represented by block 61 with a cessation of the operation of motor 115 by instructions issued from computer 125 through system illustrated in FIGS. 4 and 5. The negative branch carries the program to the determination whether valve 112 of FIG. 4 is fully closed and the motor 115 under instruction for further closing in a counterclockwise operation as represented in a decision diamond 62 of FIG. 3B. The affirmative branch of decision diamond 62 carries the program to the calculations represented by block 63 which provide a binary zero instruction to controller 116 on line 136 of FIG. 4.

Referring to FIG. 3B, the negative branch of decision diamond 62 carries the program to the determination whether the valve 112 is fully open and the motor 115 under instruction for a clockwise operating tending toward further opening as represented in a decision diamond 64. The affirmative branch of decision diamond 64 carries the program to the calculations represented by block 65 which provide a binary zero instruction to controller 116 on line 136 of FIG. 4. This disables the controller with the cessation of motor 115 operation.

The negative branch of decision diamond 64 carries the program to a determination whether the system has received a shutdown command with the valve 112 either in intermediate position decision diamond 66, or fully open decision diamond 68. An affirmative from either of these determinations carries the program to calculations represented by block 67 resulting in instructions to close valve 112 at medium speed. It will be readily understood that when this closing operation reaches the condition in the system illustrated in FIGS. 4 and 5 of the shutdown command with the valve 112 fully closed processing unit of computer 125 generates the signals of the logic of the above description of decision diamond 60 and block 61 of FIG. 3B.

The output signals generated by the logic represented at decision diamond 57 and blocks 61, 63, 65 and 67 are represented by trapezoids 58 and 59 as applied to the relays 117 and 118 and controller 116 of FIGS. 4 and 5.

Also the application of the output signals generated by the logic represented at block 69 is represented at trapezoids 58 and 59. Block 69 represents the program operation generated when in an affirmative determination at decision diamond 44 reports and actual temperature outside the normal range, i.e., over 120° F. The signals generated for transmission in the instruction form the computer 125 calculations are zeroes on line 21 and ones on line 136 and 137. Thus under the instructions resulting from the signals generated on the affirmative branch from decision diamond 44 the controller 116 is enabled to effect counterclockwise or closing motion to the valve 112 at the highest speed.

This embodiment of this invention employs a model based on the valve design which permits comparison of the discharge temperature from the detected data from the water inlets and the valve position with a designated discharge temperature, or the detected actual discharge temperature. From the parameters obtained in a step of calibrating the valve, the characteristic of the valve design which relates to the discharge temperature is calculated. This data is stored in the computer 125 and is the function of the valve position in the expression which establishes a discharge temperature from observed data at the inlets and valve position, the temperature being calculated in the computer 125. The combination of the calculated known function of the valve with the inlet temperatures produce by calculation a discharge temperature of the water at the outlet.

Figure 7:
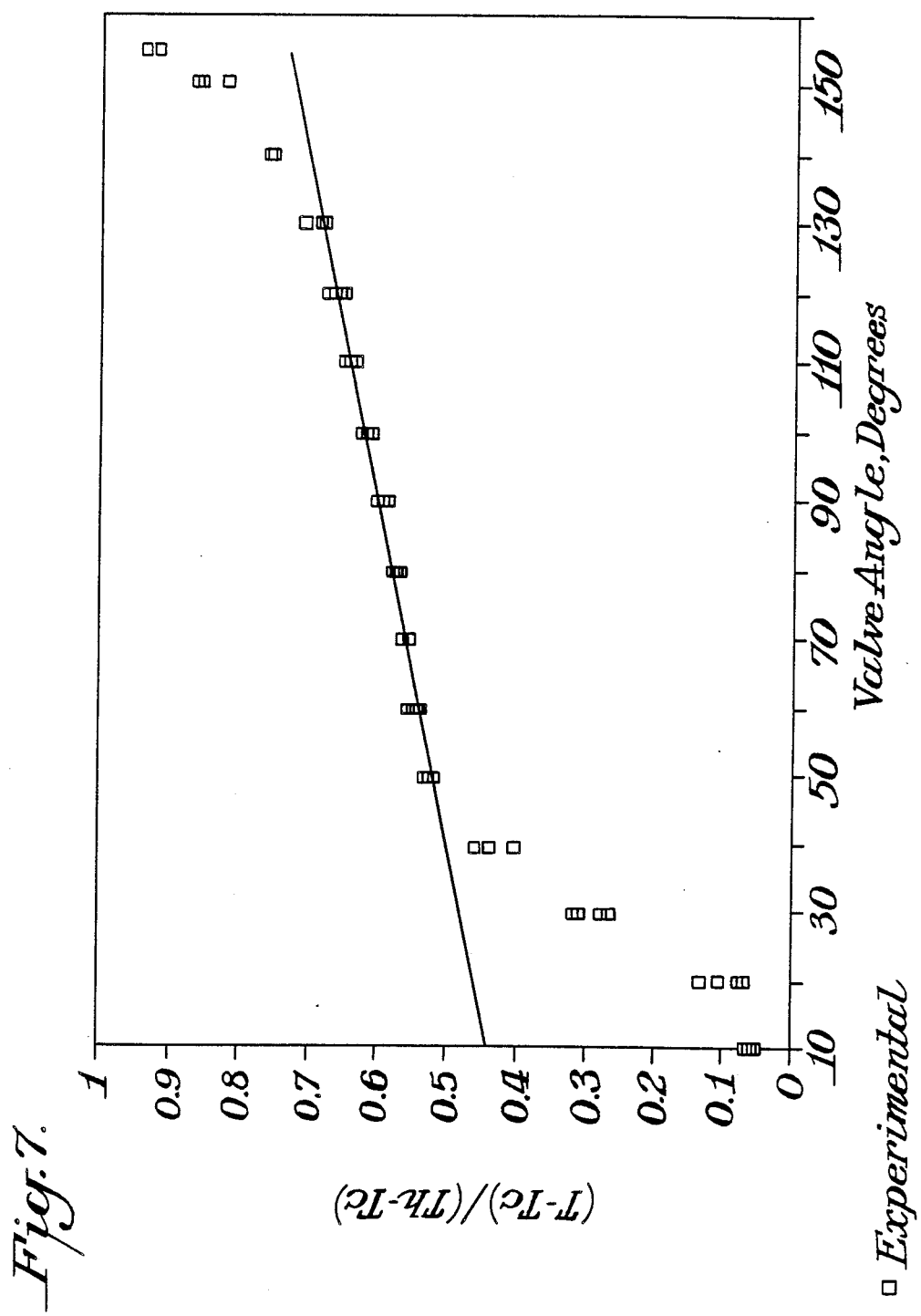
FIG. 7 is a graph of the relationship of the angle of opening of the valve and the factors determining the discharge water temperature.

One example of a characteristic function of a design of a mixing valve, such as a balanced pressure mixing valve, is illustrated in FIG. 7. FIG. 7 is a graph charting the relationship of the positioning of the mixing valve 112, as in degrees, and the temperature of the water at the discharge outlet expressed in a nondimensional variable. The valve positioning is shown on the abscissa and is represented by angular degrees of the valve opening from the closed or off position. The valve illustrated by FIG. 7 is designed to increase the relative volume of the hot water flow upon increase of the angular degrees from the closed position as exemplified by FIG. 7. The relative temperature of the water at the discharge outlet is shown on the ordinate and is represented by the nondimensional variable and increasing upwardly on the ordinate.

Thus the values plotted on the FIG. 7 graph relate the valve position to discharge water temperature. As illustrated by the determinations set forth in FIG. 7, the higher in angular degrees that the valve position is, the higher is the nondimensional variable representing the discharge water temperature and the higher the temperature of the water the the discharge outlet. As indicated by the positive slope of the curve set forth in FIG. 7, as the valve angular position increases, so does the discharge temperature, all other operating conditions remaining the same.

This curve is calculated for the specific valve design and is directly related to the valve position. As such it is a function of the valve position expressed in the nondimensional variable set forth on the ordinate. Referring again to the expression of the factors relating to the discharge water temperature and its control, the discharge temperature can be established by sensing the respective temperatures at the hot water inlet and the cold water inlet and determining the difference. This difference is then multiplied by the function of the valve angular position. To this product of this multiplication is then added the cold water temperature as sensed at the cold water inlet. The result provides a calculation of the water at the discharge outlet.

In FIG. 7 there are shown the values of the function of the valve angular position as related to varying valve positions. The values are determined for the valve design empirically to ascertain the relationship of the valve position of the specific valve design and the effect that position has on the discharge water temperature. In FIG. 7 the values determined by actual tests are illustrated. In FIG. 7 the values determine by actual use are illustrated by open squares. The tests were run under a wide variety of inlet temperatures and pressures. It can be seen from FIG. 7 within the range of experimental uncertainty that the points overlap.

Readings are taken by suitable detectors. An important aspect of the system is that the water temperature is controlled in a manner so as to permit analysis and calculation of the discharge temperature using the model of the valve design, such as particularly illustrated in FIG. 7.

The determination of the non-dimensional variable of a valve design is performed empirically for a given valve design. The mixing valve, such as the balanced pressure mixing valve Speakman Mark II valve of FIG. 7 is incorporated in a test setup so that the water temperatures at the inlets and the outlet are observed. A goniometer is mounted on the valve spindle and observations are made of discharge temperatures at varying angular positions of the valve and inlet temperatures. This data is used in the above noted equation in factoring to arrive at the non-dimensional variables as a product. Thus the functional relationship of the angle of the valve position with the water temperature is achieved. FIG. 7 illustrates this relationship for the Speakman Mark II valve.

It is noted that with a balanced pressure mixing valve, such as the Speakman Mark II valve, the shape of the characteristic curve is not dependent upon inlet water temperature or inlet pressure, or inlet pressure differentials.

A balanced pressure mixing valve as referred to herein relates to the pressure balancing valve ASSE Standard No. 1016, 1988.

DESCRIPTION OF EMBODIMENT OF FIGS. 1 AND 2

Figure 1:
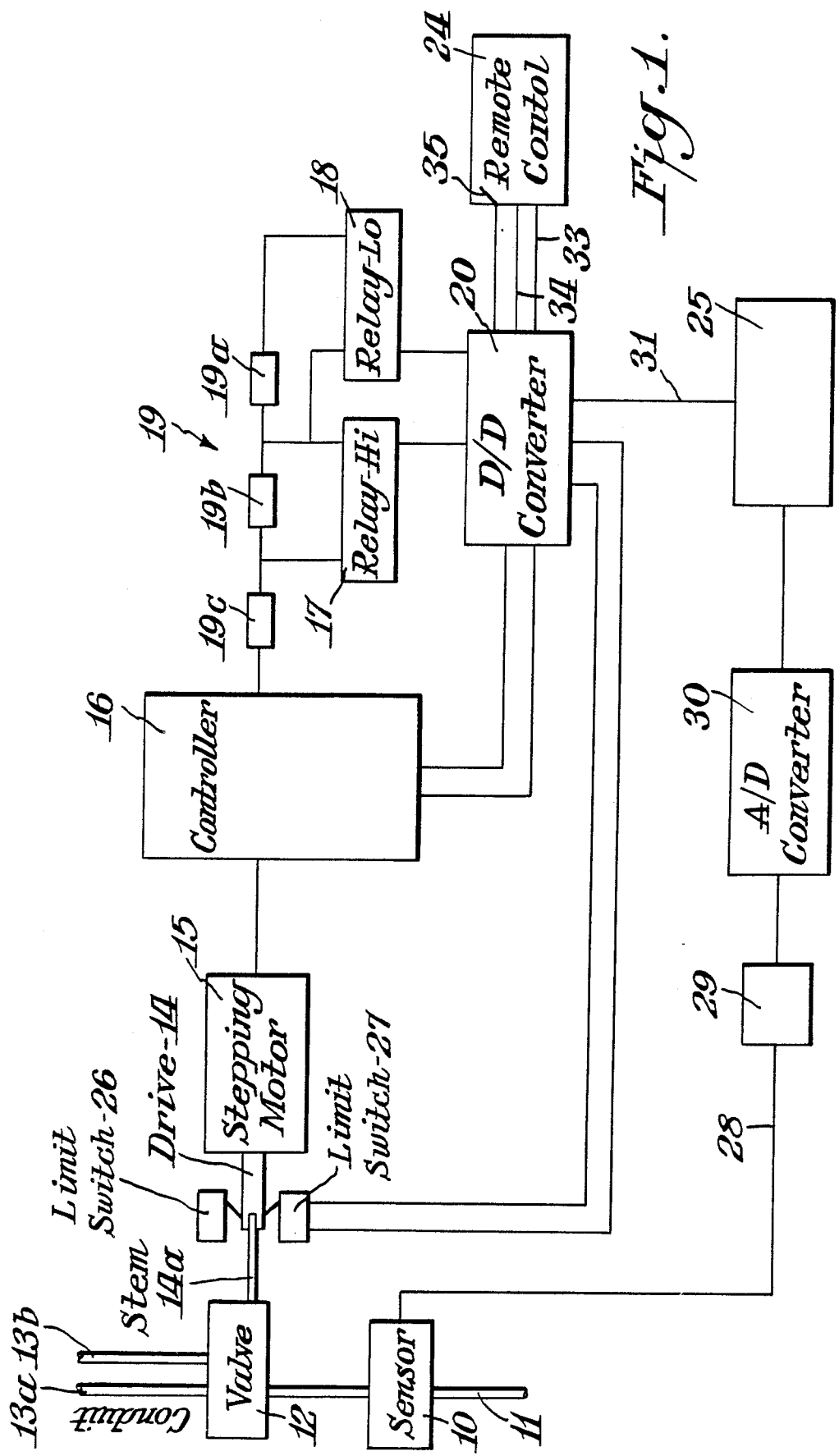
FIG. 1 is a block diagram of the valve control system in an embodiment of the present invention.

The system shown in FIG. 1 is provided with a sensor 10 in a flow stream 11 running through a standard balanced pressure mixing valve 12 (Speakman Balanced Pressure Valve) which receives a supply of liquid from a plurality of sources through suitable conduits 13a, (hot water) 13b, (cold water). A thermocouple is a suitable sensor. The valve 12 is controlled thru drive 14 of stepping motor 15, (Hurts Model ABS Stepping Motor, ABS-3008-003). The drive 14 operates on the valve stem 14a of the valve 12. The stepping motor 15 is controlled by a stepping motor controller 16 (Hurst Model 220001 Stepping Motor Controller) which provides to the stepping motor 15 speed control, clockwise/counterclockwise rotation and disengagement.

In the balanced pressure apparatus of valve 12 the flows of hot and cold water are regulated independently to yield a substantially constant total flow rate. Effects of hot or cold water pressure transients are avoided by means of the pressure balancing module. A pressure sensing means is physically displaced by changes in pressure on either hot or cold side associated with an adjustable valve means with the relationship of that association being such that increases in the sensed pressure on one side result in a valve reaction causing decrease in pressure on the same side, tending to equalize the pressures under all conditions.

Control of the stepping motor 15 and the operation of the valve 12 is provided through the controller 16, a high speed relay 17, a low speed relay 18 (Potter & Brumfield R10 E1ZZ-S800 Relays) and a voltage divider 19 having resistor sections 19a (500 kilohms), 19b (100 Kilohms and 19c (56 kilohms).

Digital outputs from a D/D converter 20 (DSDI-160, Digital ±10 Interface) on line 21 to the controller 16 and lines 22 and 23 to the high speed relay 17 and low speed relay 18, respectively send digital commands to the controller 16 and thus determine the operation of the valve 12.

The D/D converter 20 is fed signals from a remote control 24 and a computer 25 and a pair of limit switches 26 and 27. The remote control 24 is comprised of a set of switches provided with suitable power such as 5 volts. The limit switches 26 and 27 located at the valve stem 14a and drive 14 are suitably actuated by the position of the valve 12. Switch 26 is closed when the valve is fully opened and switch 27 is closed when the valve is fully closed and binary signals are provided to D/D converter 20 indicative of these conditions.

A detector network consists of the sensor 10 feeding signals through a line 28 and a panel meter 29 to an A/D converter 30 and after analog-to-digital conversion in the converter 30 digital signals to the computer 25. The computer compares the detected actual temperature value and the requested temperature value and makes calculations and decisions with this information for commands to the D/D converter 20 for translation to the converter 20 and the relays 17 and 18.

While the computer is in operation, temperatures may be requested, or the system may be turned on or shut down by signals from the remote control 24. A digital signal to raise the requested water temperature is provided to the D/D converter 20 via line 33, a digital signal to lower requested water temperature via line 34 and the shutdown from switch 35 on the control 20 via line 36.

FIG. 2 is a schematic diagram of the embodiment of the detailed description. FIG. 2 shows the connection of lines 37 and 38 to port B of the converter 20 from the limit switches 26 and 27 respectively. The lines 33, 34 and 36 from remote control 24 are connected to converter 20 at port C, and the converter 20 at port A has lines 22 and 23 to the respective relays 17 and 18 and the connection to controller 16 is shown as line 21a to a disable pin 39 and a line 21b to the pin 40 for control of the drive 14. The converter 20 is connectible with the controller through these lines 21a and 21b and 22 and 23 with binary signals transmitted as ones and zeroes. The following tables identifying the nomenclature of and utilized in the operation of the program controlled calculations in the described embodiment, particularly as demonstrated in the logic flow chart of FIGS. 3A and 3B.

TABLE I
NOMENCLATURE FOR ULTRAVALVE LOGIC

| | |
|---|---|
| TA = | Actual Temperature |
| TR = | Requested Temperature |
| D1 = | is temperature differential |
| FLAG 1 is | |

TABLE II

| | | HI SPD | MED SPD | LOW SPD |
|---|---|---|---|---|
| DV%(0) | RELAY #1 | 0 | 0 | 1 |
| DV%(1) | RELAY #2 | 0 | 1 | 1 |
| DV%(2) | DISABLE STEPPING MOTOR (0 = DISABLE, 1 = ENABLE) | | | |
| DV%(3) | ROTATION DIRECTION (0 = CW, 1 = CCW) | | | |

TABLE III
LIMIT SWITCH LOGIC (PORT B)
A = ARRAY %

| Decimal | Binary | CONDITION |
|---|---|---|
| 0 | (000) | Valve in intermediate position |
| 1 | (001) | Valve fully closed |
| 2 | (010) | Valve fully opened |
| 4 | (100) | Shutdown command, valve intermediate position |
| 5 | (101) | Shutdown command, valve fully closed |
| 6 | (110) | Shutdown command, valve fully opened |

The logic flow chart of FIG. 3 is illustrative of program operation of the program stored in the computer 25 for control of water outlet temperature.

In FIGS. 3A and 3B the program is initiated by application of power as represented at oval 41 of FIGS. 3A. Then the requested temperature is read in from the remote control as represented at trapezoid 42. The next step is the reading in from the sensor 10 and converter 30 of the actual temperature TA at READ TA represented at trapezoid 43.

The first calculation is whether the actual temperature exceeds the normal range, for example 120° F. This decision point is represented by diamond 44. If the actual temperature is greater than 120° F. at decision point 44, the computer sends out an emergency shutdown signal as discussed in greater detail below.

The negative branch of diamond 44 takes the program to the calculation of the absolute value of the difference between the actual temperature and the requested temperature by subtraction of the requested temperature in block 45. After the calculation is done the output is advance and represented by a decision diamond 46 and a judgment is made whether the difference is greater than 20° F. The affirmative branch of diamond 46 carries the program to providing a high speed control represented by block 48.

In the system illustrated in FIG. 2 in the operation represented at block 48 of FIG. 3A a signal is generated for transmission of the high speed instruction to the relays 17 and 18. The digital output from port A of converter 20 is zeroes on both lines 22 and 23. Thus, in the function the computer 25 calculations provide that the valve 12 be operated at a high speed in response to the sensing of the actual temperature.

In FIG. 3A, the negative branch from decision diamond 46 carries the program to a judgment whether the difference is greater than 5° F. as represented by decision diamond 49. The affirmative branch of diamond 49 carries the program to providing a medium speed control as represented by block 50. Referring to FIG. 2 in the operation represented at block 50 of FIG. 3A a signal is generated for transmission of a medium speed instruction to the relays 17 and 18. The digital output from port A of converter 20 is a zero on line 23 and a one on line 22. Thus in this function, the computer 25 calculations provide that the valve 12 be operated at a medium speed in response to the sensing of the actual temperature.

In FIG. 3A the negative branch from decision diamond 49 carries the program to an operation for generating a signal for transmission of the low speed instruction to the relays 17 and 18 of FIG. 2. The digital output from port A is ones on both lines 22 and 23. Thus, in this function, the computer 25 calculations provide that the valve 12 be operated at a low speed in response to the sensing of the actual temperature. In FIG. 3A, the judgment at the decision points 44, 46 and 49 performed in the computer 25 carry out the logic process of motor speed selection for the embodiment of FIGS. 1, 2 and 3.

What is claimed:

1. A method of controlling a mixing valve for providing a discharge of liquid with the aid of a digital computer comprising:
   providing said computer with a database for said control valve including a function defining the characteristics of the mixing valve and a designated discharge temperature,
   initiating a timer in said computer,
   determining the temperature of the liquid at a hot liquid inlet and at a cold liquid inlet to the valve,
   providing the computer with the temperatures at the hot liquid inlet and the cold liquid inlet and data on the valve function,
   performing in the computer calculations from the data on the temperature determinations and the valve function with the equation for the discharge temperature which is $$T_a - T_c = (T_h - T_c)F(\theta)$$

where
   $T_a$ = discharge temperature
   $T_c$ = cold liquid supply temperature
   $T_h$ = hot liquid supply temperature
   $\theta$ = angular position of the mixing valve
   $f\theta$ = function of the valve angular position, comparing the calculated discharge temperature with the designated discharge temperature,
   and adjusting the valve to provide said designated discharge temperature.

2. The method as claimed in claim 1 wherein said valve is a balanced pressure mixing valve.

3. A system for calculating the discharge temperature of liquid from a mixing valve as liquid is flowing through the valve,
   comprising
   a supply means comprised of liquid of different temperatures, one temperature substantially higher than the other,
   a mixing control valve for adjusting the mixing of said at least two different temperature liquid supplies in variable proportions,
   means at the inlets to said valve for observing the temperature of liquid flowing into said valve from said supply means and providing data in digital signals correlated to said observed temperatures,
   means for determining the angular position of the mixing control valve, and means for introducing into the system a signal in binary form for determining the position of said valve, means for calculating the discharge temperature by the data generated by temperature values and the valve position comprising means for performing in the computer calculations utilizing the data of the inlet temperature and valve position determination employing the following equation which is $$T_a = T_c + (T_h - T_c)f(\theta)$$

where $T_a$ = discharge temperature
$T_c$ = cold liquid supply temperature
$T_h$ = hot liquid supply temperature
$\theta$ = angular position of the mixing valve
$f(\theta)$ = function of the valve angular position, comparing in the computer with a designated temperature, the product from the equation,
to provide the discharge liquid temperature.

4. A system as claimed in claim 3 wherein said valve is a balanced pressure mixing valve.

5. A method of controlling a mixing valve for providing a discharge of water with the aid of a digital computer comprising:

providing said computer with a database for said control valve including a function defining the characteristics of the mixing valve and a designated discharge temperature, initiating a timer in said computer, determining the temperature of the water at a hot water inlet and at a cold water inlet to the valve, providing the computer with the temperatures at the hot water inlet and the cold water inlet and data on the valve function, performing in the computer calculations from the data on the temperature determinations and the valve function with the equation for the discharge temperature which is $$T_a - T_c = (T_h - T_c)F(\theta)$$

where $T_a$ = discharge temperature
$T_c$ = cold water supply temperature
$T_h$ = hot water supply temperature
$\theta$ = angular position of the mixing valve
$f\theta$ = function of the valve angular position, comparing the calculated discharge temperature with the designated discharge temperature, and adjusting the valve to provide said designated discharge temperature.

6. The method as claimed in claim 5 wherein said valve is a balanced pressure mixing valve.

7. A system for calculating the discharge temperature of liquid from a mixing valve as water is flowing through the valve, comprising a supply means comprised of liquid of different temperatures, one temperature substantially higher than the other, a mixing control valve for adjusting the mixing of said at least two different temperature liquid supplies in variable proportions, means at the inlets to said valve for observing the temperature of liquid flowing into said valve from said supply means and providing data in digital signals correlated to said observed temperatures, means for determining the angular position of the mixing control valve, and means for introducing into the system a signal in binary form for determining the position of said valve, means for calculating the discharge temperature by the data generated by temperature values and the valve position comprising means for performing in the computer calculations utilizing the data of the inlet temperature and valve position determination employing the following equation which is $$T_a = T_c + (T_h - T_c)f(\theta)$$

where $T_a$ = discharge temperature
$T_c$ = cold liquid supply temperature
$T_h$ = hot liquid supply temperature
$\theta$ = angular -.position of the mixing valve
$f(\theta)$ = function of the valve angular position, means for sensing the temperature of the liquid at the discharge outlet, means for comparing in the computer the calculated product of the equation with the temperature sensed at the outlet, and means responsive to the calculated and actual output values for transmitting to said mixing control valve signals to change the relative proportions of the two different water supplies.

8. A system as claimed in claim 7 wherein said valve is a balanced pressure mixing valve.

9. A system for calculating the discharge temperature of water from a balanced pressure mixing valve as water is flowing through the valve, comprising a supply means comprised of water of different temperatures, one temperature substantially higher than the other, a mixing control valve for adjusting the mixing of said at least two different temperature water supplies in variable proportions, means at the inlets to said valve for observing the temperature of water flowing into said valve from said supply means and providing data in digital signals correlated to said observed temperatures, means for determining the angular position of the mixing control valve, and means for introducing into the system a signal in binary form for determining the position of said valve, means for calculating the discharge temperature by the data generated by temperature values and the valve position comprising means for performing in the computer calculations utilizing the data of the inlet temperature and valve position determination employing the following equation which is $$T_a = T_c + (T_h - T_c)f(\theta)$$

where $T_a$ = discharge temperature
$T_c$ = cold water supply temperature $T_h$ = hot water supply temperature
$\theta$ = angular position of the mixing valve
$f(\theta)$ = function of the valve angular position,
means for sensing the temperature of the water at the discharge outlet,
means for comparing in the computer the calculated product of the equation with the temperature sensed at the outlet,
and means responsive to the calculated and actual output values for transmitting to said mixing control valve signals to change the relative proportions of the two different liquid supplies.

10. A system as claimed in claim 9 wherein said valve is a balanced pressure mixing valve.

11. A system for calculating the discharge temperature of water from a balanced pressure mixing valve as water is flowing through the valve,
comprising
a supply means comprised of water of different temperatures, one temperature substantially higher than the other,
a mixing control valve for adjusting the mixing of said at least two different temperature water supplies in variable proportions,
means at the inlets to said valve for observing the temperature of water flowing into said valve from said supply means and providing data in digital signals correlated to said observed temperatures,
means for determining the angular position of the mixing control valve,
and means for introducing into the system a signal in binary form for determining the position of said valve,
means for calculating the discharge temperature by the data generated by temperature values and the valve position
comprising
means for performing in the computer calculations utilizing the data of the inlet temperature and valve position determination employing the following equation which is $$T_a = T_c + (T_h - T_c)f(\theta)$$

where
$T_a$ = discharge temperature
$T_c$ = cold water supply temperature
$T_h$ = hot water supply temperature
$\theta$ = angular position of the mixing valve
$f(\theta)$ = function of the valve angular position,
comparing in the computer with a designated temperature, the product from the equation,
to provide the discharge water temperature.

12. A system as claimed in claim 11 wherein said valve is a balanced pressure mixing valve.

13. A system as claimed in claim 3, 7, 11, or 9 wherein said means for determining the valve angular position includes a stepping motor controller.

14. A system as claimed in claims 3, 7, 11 or 9 wherein said means for determining the valve angular position includes relays and a voltage divider.

* * * * *